United States Patent
Sanders et al.

(10) Patent No.: US 10,255,559 B1
(45) Date of Patent: Apr. 9, 2019

(54) SELF-LEARNING AND BEST-PRACTICE PROFILING AND ALERTING WITH RELATIVE AND ABSOLUTE CAPACITY

(71) Applicant: Xangati Inc., Los Altos, CA (US)

(72) Inventors: Derek Sanders, Saratoga, CA (US); Rangaswamy Jagannathan, Sunnyvale, CA (US); Rosanna Lee, Palo Alto, CA (US)

(73) Assignee: Virtual Instruments Worldwide, San Jose, CA (US)

( * ) Notice: Subject to any disclaimer, the term of this patent is extended or adjusted under 35 U.S.C. 154(b) by 0 days.

(21) Appl. No.: 15/067,168

(22) Filed: Mar. 10, 2016

Related U.S. Application Data

(63) Continuation of application No. 14/834,426, filed on Aug. 24, 2015, now abandoned.

(Continued)

(51) Int. Cl.
*G06N 99/00* (2019.01)
*H04L 12/24* (2006.01)
(Continued)

(52) U.S. Cl.
CPC ......... *G06N 99/005* (2013.01); *H04L 41/069* (2013.01); *H04L 41/0681* (2013.01);
(Continued)

(58) Field of Classification Search
CPC . G06N 99/005; H04L 41/0681; H04L 41/069; H04L 41/16; H04L 43/0882; H04L 63/1425
(Continued)

(56) References Cited

U.S. PATENT DOCUMENTS

2010/0318487 A1* 12/2010 Marvasti .............. G06N 99/005
706/47

* cited by examiner

*Primary Examiner* — Fernando Hidalgo

(57) ABSTRACT

For example, as indicated in the Incorporated Disclosures, rapid change from relatively little use of network bandwidth, to heavy overuse of network bandwidth (combined with a large number of endpoints attempting to access that network bandwidth) can often indicate an email virus or other maladjusted use of the system. In such cases, it could be appropriate to generate an alert, and bring the change to the attention of a human expert, or otherwise escalate the problem. Best practices In this Application, the phrase "best practices," and variants thereof, can generally refer to business preferences (and to business rules imposed by management, or law or regulation), such as high utilization preferences often expressed by management. In such cases, one or more operators can enter descriptors of rules the system that it is desired the system follow, such as "processor cycle utilization >90%." When these best practices are not followed, it could be appropriate to generate an alert, bring the change to the attention of a human expert, or otherwise escalate the problem. Profiling and alerting In this Application, the phrase "profiling and alerting," and variants thereof, can generally refer to maintaining a profile of how the system normally behaves, absent stressors, and to identify any substantial changes from that profile. When a profile is seriously violated, it could be appropriate to generate an alert, bring the change to the attention of a human expert, or otherwise escalate the problem. In such cases, it can be appropriate to escalate the severity of the alert with increased severity of violation, increased time duration of the violation, and increased trajectory in the direction of further violation. Relative and absolute capaci-ty In this Application, the phrase "absolute capacity," and variants thereof, can refer to an objective measure of system capacity, such as whether the system has 1 TB or 4 TB of memory.

(Continued)

The phrase "relative capacity," and variants thereof, can refer to a subjective measure of system capacity, such as when the system has 4 TB of physical memory, but 3.5 TB of that memory are allocated to a high-priority task whose interruption or pause would be untoward.

20 Claims, 2 Drawing Sheets

Related U.S. Application Data

(60) Provisional application No. 62/041,143, filed on Aug. 25, 2014.

(51) Int. Cl.
*H04L 12/26* (2006.01)
*H04L 29/06* (2006.01)

(52) U.S. Cl.
CPC .......... *H04L 41/16* (2013.01); *H04L 43/0882* (2013.01); *H04L 63/1425* (2013.01)

(58) Field of Classification Search
USPC .......................................................... 706/12
See application file for complete search history.

Method 200

SELF-LEARNING AND BEST-PRACTICE PROFILING AND ALERTING WITH RELATIVE AND ABSOLUTE CAPACITY

RELATED DOCUMENTS

Field of the Disclosure

This Application relates to technology that can be used with inventions, and other technologies, described in one or more of the following co-pending, or otherwise of interest, documents assigned to the same assignee:

U.S. application Ser. No. 12/180,437; filed Jul. 25, 2008; in the name of inventors DEREK SANDERS, RANGASWAMY JA-GANNATHAN, ROSANNA LEE, KISHOR KAKATKAR, and XIAO HONG PAN; titled "Symptom Detection Using Behavior Probability Density, Network Monitoring of Multiple Observation Values Types, and Network Monitoring Using Orthogonal Profiling Dimensions,", claiming priority of at least one Application filed earlier, a copy of which is enclosed herewith, and incorporated by reference as if fully set forth herein. Applicant claims priority of this earlier application;

U.S. application Ser. No. 12/791,704; filed Jun. 1, 2010; in the name of inventors KISHOR KAKATKAR, ROY NAKASHIMA, ROSANNA LEE, JING LIU, DEREK SANDERS, RANGASWAMY JAGAN-NATHAN, and DAVID MESSINA; titled "Recording, Replay, and Sharing of Live Network Monitoring Views,", claiming priority of at least one Application filed earlier, a copy of which is enclosed herewith, and incorporated by reference as if fully set forth herein;[1] one Application filed earlier, a copy of which is enclosed herewith, and incorporated by reference as if fully set forth herein. Applicant claims priority of this earlier application;

U.S. Application Ser. No. 62/041,130; filed Aug. 24, 2014; in the name of inventors ROSANNA LEE, RANGASWAMY JAGAN-NATHAN, and JING LIU; titled "Push Pull Data Collection,", claiming priority of at least one Application filed earlier, a copy of which is enclosed herewith, and incorporated by reference as if fully set forth herein;[1,2,3] one Application filed earlier, a copy of which is enclosed herewith, and incorporated by reference as if fully set forth herein. Applicant claims priority of this earlier application;

U.S. application Ser. No. 14/834,367; filed Aug. 24, 2015; in the name of inventors DEREK SANDERS, RANGASWAMY JAGAN-NATHAN, and ROSANNA LEE; titled "Push Pull Data Collection,", claiming priority of at least one Application filed earlier, a copy of which is enclosed herewith, and incorporated by reference as if fully set forth herein;[3] one Application filed earlier, a copy of which is enclosed herewith, and incorporated by reference as if fully set forth herein. Applicant claims priority of this earlier application;

U.S. Application Ser. No. 62/041,141; filed Aug. 24, 2014; in the name of inventors ROSANNA LEE, RANGASWAMY JAGAN-NATHAN, and JING LIU; titled "Cross Silo Time Stitching,", claiming priority of at least one Application filed earlier, a copy of which is enclosed herewith, and incorporated by reference as if fully set forth herein;[4] one Application filed earlier, a copy of which is enclosed herewith, and incorporated by reference as if fully set forth herein. Applicant claims priority of this earlier application;

U.S. application Ser. No. 14/834,371; filed Aug. 24, 2015; in the name of inventors DEREK SANDERS, RANGASWAMY JAGAN-NATHAN, and ROSANNA LEE; titled "Cross Silo Time Stitching,", claiming priority of at least one Application filed earlier, a copy of which is enclosed herewith, and incorporated by reference as if fully set forth herein;[3] one Application filed earlier, a copy of which is enclosed herewith, and incorporated by reference as if fully set forth herein. Applicant claims priority of this earlier application;

U.S. Application Ser. No. 62/041,140; filed Aug. 24, 2014; in the name of inventors JING LIU, RANGASWAMY JAGAN-NATHAN, and ROSANNA LEE; titled "Enhanced Flow Processing,", claiming priority of at least one Application filed earlier, a copy of which is enclosed herewith, and incorporated by reference as if fully set forth herein;[6] one Application filed earlier, a copy of which is enclosed herewith, and incorporated by reference as if fully set forth herein. Applicant claims priority of this earlier application;

U.S. application Ser. No. 14/834,424; filed Aug. 24, 2015; in the name of inventors DEREK SANDERS, ROSANNA LEE, and RANGASWAMY JAGAN-NATHAN; titled "Enhanced Flow Processing,", claiming priority of at least one Application filed earlier, a copy of which is enclosed herewith, and incorporated by reference as if fully set forth herein;[4,5,6] one Application filed earlier, a copy of which is enclosed herewith, and incorporated by reference as if fully set forth herein. Applicant claims priority of this earlier application;

U.S. Application Ser. No. 62/041,143; filed Aug. 24, 2014; in the name of inventors DEREK SANDERS, RANGASWAMY JAGAN-NATHAN, and ROSANNA LEE; titled "Self-Learning and Best-Practice Profiling and Alerting with Relative and Absolute Capacity,", claiming priority of at least one Application filed earlier, a copy of which is enclosed herewith, and incorporated by reference as if fully set forth herein;[8] one Application filed earlier, a copy of which is enclosed herewith, and incorporated by reference as if fully set forth herein. Applicant claims priority of this earlier application;

U.S. application Ser. No. 14/834,426; filed Aug. 24, 2015; in the name of inventors DEREK SANDERS, RANGASWAMY JAGAN-NATHAN, and ROSANNA LEE; titled "Self-Learning and Best-Practice Profiling and Alerting with Relative and Absolute Capacity,", claiming priority of at least one Application filed earlier, a copy of which is enclosed herewith, and incorporated by reference as if fully set forth herein;[9] one Application filed earlier, a copy of which is enclosed herewith, and incorporated by reference as if fully set forth herein. Applicant claims priority of this earlier application;

U.S. Application Ser. No. 62/041,135; filed Aug. 24, 2014; in the name of inventors ROSANNA LEE, DEREK SANDERS, and RANGASWAMY JAGAN-NATHAN; titled "Storm Detection, Analysis, Remediation, and Other Network Behavior,", claiming priority of at least one Application filed earlier, a copy of which is enclosed herewith, and incorporated by reference as if fully set forth herein;[10] one Application filed earlier, a copy of which is enclosed herewith, and incorporated by reference as if fully set forth herein. Applicant claims priority of this earlier application;

U.S. application Ser. No. 14/834,428; filed Aug. 24, 2015; in the name of inventors DEREK SANDERS, RANGASWAMY JAGAN-NATHAN, and ROSANNA LEE; titled "Storm Detection, Analysis, Remediation, and Other Network Behavior,", claiming priority of at least one Application filed earlier, a copy of which is enclosed herewith, and incorporated by reference as if fully set forth herein;[7] one Application filed earlier, a copy of which is enclosed herewith, and incorporated by reference as if fully set forth herein. Applicant claims priority of this earlier application;

A Technical Appendix having 2 pages, both titled "Xangati solution architecture extensible across cloud applications and cloud stacks", copies of which is enclosed herewith, and incorporated by reference as if fully set forth herein. Applicant claims priority of this earlier application.

Each and every one of these documents, as well as all documents cited therein, are hereby incorporated by reference as if fully recited herein.

This Application claims priority of each and every one of these documents, to the fullest extent possible.

The specification does not contain "new matter."

BACKGROUND

Field of the Disclosure

This Application can relate to self-learning and best-practices profiling and alerting with relative and absolute capacity, and other matters.

For example, this Application can include information relating to self-learning and best-practices profiling and alerting with relative and absolute capacity in a distributed network monitoring environment.

Other and further possibilities are described herein.

Related Art

One problem that has arisen, particularly in the field of network monitoring, is that of determining when to signal an alert, to indicate to one or more operators or users that there is a maladjustment with the distributed network monitoring environment. For example, if the distributed network monitoring environ-ment is subject to a malware attack, its behavior might change significantly, with the effect that one or more operators or users might notice the change in reliability, responsiveness, or other features of the system. However, it is also possible that, even if the distributed network monitoring environment is severely maladjusted, that many, even all, operators and users might fail to notice any change. Similarly, if there is resource contention in the distributed network monitoring environment, or other unusual behavior, or if the distributed network monitoring environment is under provisioned, there can be problems with operating the distributed network monitoring environment even if no alerts are generated or noticed.

One possibility is to attempt to detect when the distributed network monitoring environment has a radical change in behavior, such as when subject to a malware attack, or when subject to an attack by a malicious insider. However, this can be subject to a number of drawbacks, including one or more of the following:

The distributed network monitoring environment might incur a radical change in behavior in response to a repurposing of at least a portion thereof. For example, if a distributed network monitoring environment were originally designed for office workers, whose primary computing tasks included email and text processing; and a substantial portion of the system were repurposed for use by a game-programming and testing team, one might expect that operating parameters exhibited by the distributed network monitoring environment-would change so substantially that the distributed network monitoring environment-would appear to be malfunctioning or under attack. However, this would be almost the opposite of the truth. Similarly, if the distributed network monitoring environment were originally designed for office workers whose primary computing tasks included email and text processing, and the local home team were to succeed in winning the World Series of Baseball (particularly if they were the Chicago Cubs), one might expect that there would be an eruption of human behavior that might make the distributed network monitoring environment look as if it were the subject of a serious cyber-attack.

The distributed network monitoring environment might be infiltrated by sophisticated criminals who were capable of spreading controllable malware to most of the network devices in the distributed network monitoring environment, but who were able to conceal their activities until such time as they deemed best to attack. In such circumstances, even quite airtight security measures might be insufficient to protect important business assets from the planned attack.

The distributed network monitoring environment might be in use by fraudsters who had legitimate access to important business assets, such as information technology personnel who have been paid off or who have become disaffected with the operators of the distributed network monitoring environment. In such cases, even quite airtight security measures would be insufficient, as the persons damaging the distributed network monitoring environment are in fact actually authorized to do so.

In fact, the fields of computer maintenance and computer security are sufficiently replete with errors and holes that no security system has been found to be immune to attack, damage, error, fraud, mistake, or related problems.

Moreover, the fields of computer efficiency and computer maintenance are subject to numerous problems that can easily appear innocent, and to numerous innocent activities that can easily appear malicious, particularly in finance.

One possibility is to attempt to use machine learning (sometimes referred to as "selflearning," particularly when no supervised training is used). However, machine learning can be subject to several drawbacks. For example, machine learning can be subject to rapid changes in behavior that are innocent, and slow changes in behavior that are quite malicious, just as in some of the examples noted above.

Another possibility is to use human supervision over the distributed network monitoring environment. This can be quite effective, as humans are quite good at recognizing patterns, particularly patterns that are distorted from the ordinary patters than would be expected when the distributed network monitoring environment is in use. On the other hand, humans can be easily fooled, as a generation of cognitive psychology experiments have shown, with the effect that it is not at all difficult to device techniques that could prompt the most careful, expert, and suspicious overseers to allow in trouble.

Moreover, many businesses desire that their distributed network monitoring environment-operate according to selected parameters. For example, many businesses do not wish to overpay for computing equipment; therefore, they desire to assure that the equipment they have already paid for is operated at a very high capacity. This leads to the desire by managers to assure that processor cycle utilization, network bandwidth utilization, and a number of other measures of "use" do not fall below 90%.

Some Drawbacks of the Known Art

Each of these issues, as well as other possible considerations, might cause difficulty in aspects of attempting to maintain both an efficient and secure computing system, particularly in a distributed network monitoring environment.

BRIEF SUMMARY

Self-learning In this Application, the phrase "self-learning," and variants thereof, can generally refer to machine learning techniques, and similar techniques, in which automated processes provide a profile of "normal" activity of the distributed network monitoring environment, with the effect that rapid deviation from normal activity can be a relatively reliable indicator of changes in the nature of system use. For example, as indicated in the Incorporated Disclosures, rapid change from relatively little use of network bandwidth, to heavy overuse of network bandwidth (combined with a large number of endpoints attempting to access that network bandwidth) can often indicate an email virus or other maladjusted use of the system. In such cases, it could be appropriate to generate an alert, and bring the change to the attention of a human expert, or otherwise escalate the problem.

Best practices In this Application, the phrase "best practices," and variants thereof, can generally refer to business preferences (and to business rules imposed by management, or law or regulation), such as high utilization preferences often expressed by management. In such cases, one or more operators can enter descriptors of rules the distributed network monitoring en-vironment that it is desired the system follow, such as "processor cycle utilization >90%." When these best practices are not followed, it could be appropriate to generate an alert, bring the change to the attention of a human expert, or otherwise escalate the problem.

Profiling and alerting In this Application, the phrase "profiling and alerting," and variants thereof, can generally refer to maintaining a profile of how the distributed network monitoring environment normally behaves, absent stressors, and to identify any substantial changes from that profile. When a profile is seriously violated, it could be appropriate to generate an alert, bring the change to the attention of a human expert, or otherwise escalate the problem. In such cases, it can be appropriate to escalate the severity of the alert with increased severity of violation, increased time duration of the violation, and increased trajectory in the direction of further violation.

Relative and absolute capacity In this Application, the phrase "absolute capacity," and variants thereof, can refer to an objective measure of system capacity, such as whether the system has 1 TB or 4 TB of memory. The phrase "relative capacity," and variants thereof, can refer to a subjective measure of system capacity, such as when the system has 4 TB of physical memory, but 3.5 TB of that memory are allocated to a high-priority task whose interruption or pause would be untoward. Other and further details are included herein.

This Application

After reading this application, those skilled in the art would recognize that techniques shown in this application are applicable to more than just the specific embodiments shown herein. For example, the applicability of the techniques shown herein can broadly encompass a wide variety of network monitoring techniques.

Figure 1:
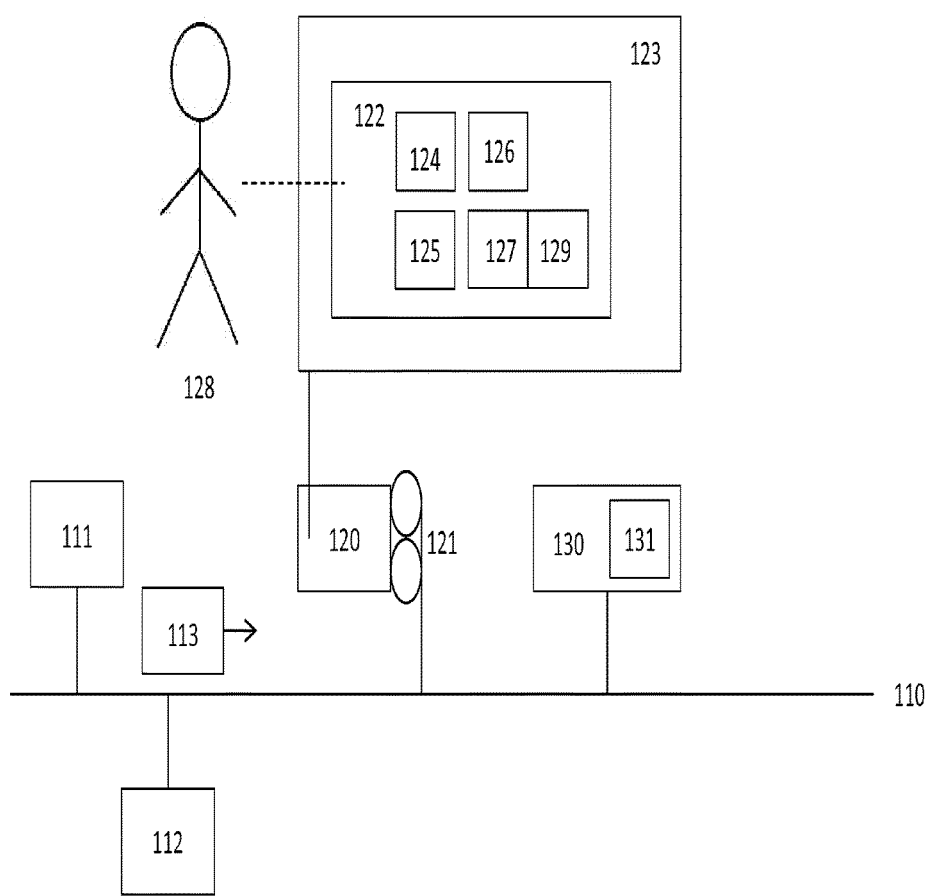
FIG. 1 shows a conceptual drawing of a system, and method of making the same.

Appendix 1 shows a flow diagram of data in a distributed network monitoring environment.

Appendix 1 shows a second flow diagram of data in a distributed network monitoring environment.

DETAILED DESCRIPTION OF AN EMBODIMENT

Terminology

Generality of the Description

Ideas and technologies shown or suggested by this description should be thought of in their most general form, including without limitation, the following:

The phrases "in one embodiment," and variants thereof, generally indicate that a particular characteristic, feature, or structure, described herein is included in at least one embodiment of the invention. Uses of these phrases do not necessarily all refer to the same embodiment. Rather, the specific particular characteristic, feature, or structure, described herein might be combined in any suitable manner into one or more distinct possible embodiments.

The phrases and terms "machines, methods, articles of manufacture, and compositions of matter," "techniques," and variants thereof, generally indicate any material suitable for description, including without limitation all such material within the scope of patentable subject matter. Whenever a method step is described, those skilled in the art would know, without further invention or undue experiment, that this application thereby also describes a product, such as one maintaining instructions that are interpretable by a computing device, where those instructions direct one or more devices to perform that method step.

The terms "relatively," and variants thereof, generally indicates any relationship in which a comparison is possible, including without limitation "relatively less," "relatively more," and otherwise. In the context of the invention, where a measure or value is indicated to have a relationship "relatively," that relationship need not be precise, need not be well-defined, and need not be by comparison with any particular or specific other measure or value. For example and without limitation, whenever a measure or value is "relatively increased" or "relatively more," that comparison need not be with respect to any known measure or value, but might be with respect to a measure or value held by that measurement or value at another place or time, or with respect to a measure or value commonly used in the art.

The terms "substantially," and variants thereof, generally indicates any circumstance in which a determination, measure, value, or otherwise, is equal, equivalent, nearly equal, nearly equivalent, or approximately, what the measure or value is recited. The phrases "substantially all,"

"substantially none," and variants thereof, generally indicate any circumstance in which all but a relatively minor amount or number (for "substantially all") or none but a relatively minor amount or number (for "substantially none") have the stated property. The phrase "substantial effect," and variants thereof, generally indicate any circumstance in which an effect might be detected or determined.

After reading this application, those skilled in the art would realize that the invention is not in any way limited to the specifics of any particular example. Many other variations are possible that remain within the content, scope and spirit of the invention, and these variations would be clear to those skilled in the art, without further invention or undue experiment Specific Phrases and Terms One or more of the following phrases and terms are used in this application. Where clear from the context, they have the meanings described below. However, after reading this application, those skilled in the art would recognize that these phrases and terms can have other, broader and further, meanings as well or instead.

The phrases "data storage," and variants thereof, generally indicate one or more real or virtual devices that are capable of maintaining data or information for later access, either by the same device that stored the data or information, or by another device.

The phrases "monitoring device," "network monitoring," and variants thereof, generally indicate one or more real or virtual devices that can perform the functions of monitoring network devices, or their activity, such as by determining or gleaning status data information, collating that status data information, and processing that collated status data information.

The phrases "network device," and variants thereof, generally indicate any device including computational capacity, such as a real or virtual processing substrate, a real or virtual data storage element, a real or virtual network communication element, a real or virtual memory, or otherwise.

After reading this application, those skilled in the art would realize that the invention is not in any way limited to the specifics of any particular example. Many other variations are possible that remain within the content, scope and spirit of the invention, and these variations would be clear to those skilled in the art, without undue experiment or further invention.

System Elements

FIG. 1 shows a conceptual drawing of a system, and method of making the same.

A system 100 includes elements described herein, other elements shown in the figure, and possibly other elements. Not all elements are required. Elements should be considered optional, unless otherwise specified or unless clearly obvious for operation of the system.

Communication Network

The system 100 can include a communication network 110, suitably disposed to interact with other elements described herein. In general, when elements described herein communicate, they do so using the communication network 110. The communication network 110 can include one or more network devices 111, such as network routers, and can be disposed as a TCP/IP network, an IEEE 802.11 wireless communication network 110, an Ethernet or other local communication network 110, a subdivision of the Internet, or otherwise. The communication network 110 can also include one or more network monitoring devices 112, coupled to the communication network 110, and capable of reviewing message packets 113 that are transmitted on the communication network 110, without interfering with transmission or reception of those message packet 113.

Computing Device

The system 100 (in particular, the network devices 111) can include one or more computing devices 120, such as computing servers, quantum computers, or other types of computing devices. Each particular computing device 120 of the one or more computing devices 120 can include one or more ports 121 coupling the particular computing device 120 to the communication network 110, with the effect that the particular computing device 120 can exchange message packets 113 with other devices coupled to the communication network 110.

Virtual Machine

Each particular computing device 120 can also include one or more virtual machines 122, each virtual machine 122 being capable of being controlled by a hypervisor 123 that is executed by the particular computing device 120. Each virtual machine 122 can include a host operating system 124 (controlled by the hypervisor 123) and one or more guest operating systems 125 (each controlled by a host operating system 124). Each virtual machine 122 can also include one or more application servers 126 (controlled by the guest operating system 125), each capable of receiving messages from a client device (a particular network device 111, as otherwise and further described herein) and capable of responding to those messages.

Virtual Desktop

Each virtual machine 122 can execute an application server 126 that presents a virtual desktop 127 to one or more users 128. In such cases, the virtual desktop 127 can include one or more output elements (such as a display screen and/or a speaker), and be responsive to one or more input devices (such as a keyboard and/or a pointing device), each showing one or more application programs executing in a windowing system, with the effect that a particular user 128 can interact with the virtual desktop 127, using the communication network 110, as if the particular user 128 were physically present at the virtual machine 122 and, by implication, at the particular computing device 120 on which that virtual machine 122 is executed.

Virtual Desktop Implementation

In one embodiment, one or more of those virtual desktops 127 can include, or be coupled to, a virtual desktop implementation 129. The virtual desktop implementation 129 can include a software program executed by the virtual machine 122, capable of exchanging message packets 113 with the user 128, in which the message packets 113 can be substantially compressed and can include substantial error correcting coding. This can have the effect that communication between the virtual desktop 127 and the user 128 can be sufficiently smooth as if the virtual desktop 127 and the user 128 were physically local, and that their exchange of messages using the communication network 110 were substantially invisible to the user 128.

Database

In one embodiment, the system 100 can include a database 130, or other data maintenance or data storage element, capable of maintaining status data information communicated, using the message packets 113, between the one or more network devices 111 and the one or more network monitoring devices 112. The database 130 can be disposed substantially locally, such as substantially directly coupled to the communication network 110, or can be disposed substantially remotely, such as substantially indirectly coupled to other elements that are eventually coupled to the communication network 110. The database 130 can include one or more real or virtual data stores 131, such as disk drives, flash drives, or other storage techniques.

Network Monitoring

In one embodiment, the system 100 can include one or more network monitoring devices 112, as described herein. The network monitoring devices 112 can be disposed to exchange message packets 113 with the one or more network devices 111, the one or more computing devices 120, the one or more virtual machines 122, the one or more virtual desktop implementations 129, the one or more databases 130, and any other elements coupled to the system 100. For example, the one or more network monitoring devices 112 can exchange message packets 113 with the one or more network devices 111, with the effect that the network monitoring devices 112 can receive status data information with respect to any interaction in the system 100. This can include interactions between any pair of devices (whether same or different) described herein.

Alternative Embodiments

After reading this Application, those having ordinary skill in the art will recognize that the particular elements described herein, their particular cooperation and organization, and their particular use as described herein, can be substantially altered while remaining within the scope and spirit of the invention, and that such alterations would work without undue experiment or further invention.

Method of Use

Figure 2:
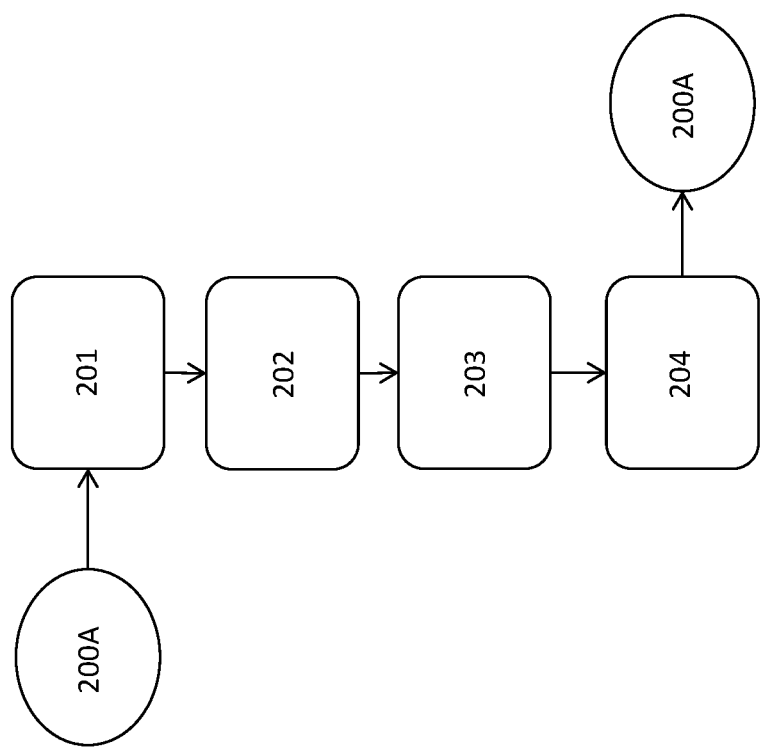
FIG. 2 shows a conceptual drawing of a method of operation.

FIG. 2 shows a conceptual drawing of a method of operation.

A method 200 includes flow points and method steps as described herein, other elements shown in the figure, and possibly other elements. Not all elements are required. Elements should be considered optional, unless otherwise specified or unless clearly obvious for operation of the system.

These flow points and method steps are, by the nature of the written word, described in one particular order. This description does not limit the method to this particular order. The flow points and method steps might be performed in a different order, or concurrently, or partially concurrently, or otherwise in a parallel, pipelined, quasiparallel, or other manner. They might be performed in part, paused, and returned to for completion. They might be performed as co-routines or otherwise. In the context of the invention, there is no particular reason for any such limitation.

One or more portions of the method 200 are sometimes described as being performed by particular elements of the system 100 described with respect to FIG. 1, or sometimes by "the method" itself. When a flow point or method step is described as being performed by "the method," it can be performed by one or more of those elements, by one or more portions of those elements, by an element not described with respect to the figure, by a combination or conjunction thereof, or otherwise.

Flow Points and Method Steps

Beginning of Method

A flow point 200A indicates a beginning of the method 200. At this flow point, the method 200 can initialize variables and reset/set state, as appropriate.

In one embodiment, this can be conducted in parallel, and the method 200 can perform the steps following those flow points in parallel, concurrently, or in any other reasonably convenient order, as determined by the network monitoring device 112.

Self-Learning

At a step 201, the network monitoring device 112 attempts to apply selflearning techniques, as descried in other and further detail in the Incorporated Disclosures.

At a step 202, the network monitoring device 112 attempts to apply best-practices procedures, as described above in other an further detail in the Incorporated Disclosures.

For example, a scripting language can be provided so that information technology personnel can prepare best-practices rules at the behest of management. If the best-practices procedures are violated, as in if the system violates the behavior that is desired by management, a process can be executed to determine if an alert should be generated, and if so, an alert might be generated and sent to one or more appropriate recipients. The method 200 can proceed with the next step.

At a step 203, the network monitoring device 112 attempts to determine if the self-learning techniques, or the best-practices procedures, are violated with respect to the "absolute capacity" of the system, as described in other and further detail herein. If the system violates the self-learning techniques, or the best-practices procedures, with respect to the absolute capacity of the system, a process can be executed to determine if an alert should be generated, and if so, an alert might be generated and sent to one or more appropriate recipients. The method 200 can proceed with the next step.

At a step 204, the network monitoring device 112 attempts to determine if the self-learning techniques, or the best-practices procedures, are violated with respect to the "relative capacity" of the system, as described in other and further detail herein. If the system violates the sell-learning techniques, or the best-practices procedures, with respect to the absolute capacity of the system, a process can be executed to determine if an alert should be generated, and if so, an alert might be generated and sent to one or more appropriate recipients. The method 200 can proceed with the flow point 200B.

A flow point 200B indicates that the method 200 is finished. When the next alert storm occurs, the method 200 returns to the earlier flow point 200A.

Alternative Embodiments

Similar Elements or Steps

While this application is primarily described with respect to self-learning and best-practices profiling and alerting with relative and absolute capacity, after reading this Application, those of ordinary skill in the art will recognize that there is no particular requirement for any such limitation. For example, techniques described herein can also be applied to other circumstances in which it is desired to ameliorate other conditions besides alert storms.

For example, the techniques described and suggested herein (including machines, methods, articles of manufacture, and compositions of matter) can be applied to any distributed network monitoring environment.

Specification not Limiting

After reading this Application, those skilled in the art would recognize that the invention is not limited to only the specifically described embodiments, that many variations are within the scope and spirit of the invention, and would be workable without undue experiment or further invention.

Claims Included in Specification

The Claims in this Application are hereby included by reference in the text of the Specification.

The invention claimed is:

1. Apparatus including
a network monitoring device, the network monitoring device responsive to network status data from one or more reporting devices coupled to a distributed network monitoring environment, the one or more reporting devices providing the network status data with respect to more than one function to be performed by network devices, the distributed network monitoring environment including a plurality of endpoints coupled thereto and disposed to access resources available using the distributed network monitoring environment;
the network monitoring device including one or more automated processes that provide, in response to the network status data, a profile of normal activity of the distributed network monitoring environment, wherein a rapid deviation from normal activity of the distributed network monitoring environment provides a reliable indicator of changes in use of the distributed network monitoring environment, the automated processes providing the profile of normal activity of the distributed network monitoring environment using self learning in response to the network status data;
the network monitoring device being coupled to business rules defining a set of best practices of operation of the distributed network monitoring environment, wherein the best practices rules are described by a scripting language in response to management;
the network monitoring device providing an alert to one or more operators in response to the network status data indicating that the distributed network monitoring environment falls outside the profile of normal activity, either with respect to the total capacity of the distributed network management environment, or with respect to the relative capacity of the distributed network management environment;
the network monitoring device providing an alert to one or more operators in response to the network status data indicating that the distributed network monitoring environment falls outside the set of best practices of operation, either with respect to the total capacity of the distributed network management environment, or with respect to the relative capacity of the distributed network management environment.

2. Apparatus as in claim 1,
wherein the rapid deviation from normal activity includes one or more of:
rapid change in number of database requests, combined with rapid change in number of endpoints making database requests;
rapid change in data storage usage, combined with allocation of data storage usage to a small number of endpoints occupying the bulk of the data storage usage;
rapid change in usage of network bandwidth, combined with rapid change in number of endpoints attempting to access network bandwidth;
rapid change in processor usage, combined with rapid change in number of endpoints attempting to access processor usage;
rapid change in virtual desktop usage, combined with allocation of virtual desktop usage to a small number of endpoints occupying the bulk of the virtual desktop usage;
rapid change in virtual machine usage, combined with allocation of virtual desktop usage to a small number of endpoints occupying the bulk of the virtual desktop usage.

3. Apparatus as in claim 1,
wherein the set of best practices includes one or more of:
rules imposed by management,
rules imposed by law or regulation.

4. Apparatus as in claim 1,
wherein the set of best practices includes one or more of:
a rule requiring utilization of a selected resource to be less than a selected threshold;
a rule requiring utilization of a selected resource to fall within a selected range;
a rule requiring utilization of a selected resource to exceed a selected threshold.

5. Apparatus as in claim 4,
wherein the selected resource includes one or more of:
database usage, data storage usage, network bandwidth usage, processor usage, virtual desktop usage, virtual machine usage.

6. Apparatus as in claim 4,
wherein the utilization distinguishes between absolute capacity and relative capacity.

7. A method of operating a network monitoring device, the method including steps of
coupling the network monitoring device to network status data from one or more reporting devices coupled to a distributed network monitoring environment, the one or more reporting devices providing the network status data with respect to more than one function to be performed by network devices, the distributed network monitoring environment including a plurality of endpoints coupled thereto and disposed to access resources available using the distributed network monitoring environment;
performing, by the network monitoring device, one or more automated processes that provide, in response to the network status data, a profile of normal activity of the distributed network monitoring environment, wherein a rapid deviation from normal activity of the distributed network monitoring environment provides a reliable indicator of changes in use of the distributed network monitoring environment, the automated processes providing the profile of normal activity of the distributed network monitoring environment using self learning in response to the network status data;
coupling the network monitoring device to business rules defining a set of best practices of operation of the distributed network monitoring environment, wherein the best practices rules are described by a scripting language in response to management;
first providing an alert to one or more operators in response to the network status data indicating that the distributed network monitoring environment falls outside the profile of normal activity, either with respect to the total capacity of the distributed network management environment, or with respect to the relative capacity of the distributed network management environment;
second providing an alert to one or more operators in response to the network status data indicating that the distributed network monitoring environment falls outside the set of best practices of operation, either with respect to the total capacity of the distributed network management environment, or with respect to the relative capacity of the distributed network management environment.

8. A method as in claim 7,
wherein the rapid deviation from normal activity includes one or more of:
rapid change in number of database requests, combined with rapid change in number of endpoints making database requests;
rapid change in data storage usage, combined with allocation of data storage usage to a small number of endpoints occupying the bulk of the data storage usage;
rapid change in usage of network bandwidth, combined with rapid change in number of endpoints attempting to access network bandwidth;
rapid change in processor usage, combined with rapid change in number of endpoints attempting to access processor usage;
rapid change in virtual desktop usage, combined with allocation of virtual desktop usage to a small number of endpoints occupying the bulk of the virtual desktop usage;
rapid change in virtual machine usage, combined with allocation of virtual desktop usage to a small number of endpoints occupying the bulk of the virtual desktop usage.

9. A method as in claim 7,
wherein the set of best practices includes one or more of:
rules imposed by management,
rules imposed by law or regulation.

10. A method as in claim 7,
wherein the set of best practices includes one or more of:
a rule requiring utilization of a selected resource to be less than a selected threshold;
a rule requiring utilization of a selected resource to fall within a selected range;
a rule requiring utilization of a selected resource to exceed a selected threshold.

11. A method as in claim 10,
wherein the selected resource includes one or more of:
database usage, data storage usage, network bandwidth usage, processor usage, virtual desktop usage, virtual machine usage.

12. A method as in claim 10,
wherein the utilization distinguishes between absolute capacity and relative capacity.

13. A non-transitory memory maintaining instructions directing a network monitoring device to perform steps of
coupling the network monitoring device to network status data from one or more reporting devices coupled to a distributed network monitoring environment, the one or more reporting devices providing the network status data with respect to more than one function to be performed by network devices, the distributed network monitoring environment including a plurality of endpoints coupled thereto and disposed to access resources available using the distributed network monitoring environment;
performing, by the network monitoring device, one or more automated processes that provide, in response to the network status data, a profile of normal activity of the distributed network monitoring environment, wherein a rapid deviation from normal activity of the distributed network monitoring environment provides a reliable indicator of changes in use of the distributed network monitoring environment, the automated processes providing the profile of normal activity of the distributed network monitoring environment using self learning in response to the network status data;
coupling the network monitoring device to business rules defining a set of best practices of operation of the distributed network monitoring environment, wherein the best practices rules are described by a scripting language in response to management;
first providing an alert to one or more operators in response to the network status data indicating that the distributed network monitoring environment falls outside the profile of normal activity, either with respect to the total capacity of the distributed network management environment, or with respect to the relative capacity of the distributed network management environment;
second providing an alert to one or more operators in response to the network status data indicating that the distributed network monitoring environment falls outside the set of best practices of operation, either with respect to the total capacity of the distributed network management environment, or with respect to the relative capacity of the distributed network management environment.

14. A memory as in claim 13,
wherein the rapid deviation from normal activity includes one or more of:
rapid change in number of database requests, combined with rapid change in number of endpoints making database requests;
rapid change in data storage usage, combined with allocation of data storage usage to a small number of endpoints occupying the bulk of the data storage usage;
rapid change in usage of network bandwidth, combined with rapid change in number of endpoints attempting to access network bandwidth;
rapid change in processor usage, combined with rapid change in number of endpoints attempting to access processor usage;
rapid change in virtual desktop usage, combined with allocation of virtual desktop usage to a small number of endpoints occupying the bulk of the virtual desktop usage;
rapid change in virtual machine usage, combined with allocation of virtual desktop usage to a small number of endpoints occupying the bulk of the virtual desktop usage.

15. A memory as in claim 13,
wherein the set of best practices includes one or more of:
rules imposed by management,
rules imposed by law or regulation.

16. A memory as in claim 13,
wherein the set of best practices includes one or more of:
a rule requiring utilization of a selected resource to be less than a selected threshold;
a rule requiring utilization of a selected resource to fall within a selected range;
a rule requiring utilization of a selected resource to exceed a selected threshold.

17. A memory as in claim 16,
wherein the selected resource includes one or more of:
database usage, data storage usage, network bandwidth usage, processor usage, virtual desktop usage, virtual machine usage.

18. A memory as in claim 16,
wherein the utilization distinguishes between absolute capacity and relative capacity.

19. A method as in claim 7,
wherein the steps of coupling to network status data from one or more reporting devices include the one or more reporting devices providing the network status data with respect to one or more of: virtual machines, virtual desktops, or virtual desktop implementations.

20. A method as in claim 7,
wherein the steps of performing one or more automated processes include self-learning techniques by which the network monitoring device can determine when one or more of: the defined absolute capacity, or the defined absolute capacity relative capacity, procedures of the network are being violated.

\* \* \* \* \*